United States Patent
Krishnappa et al.

(10) Patent No.: US 11,288,275 B2
(45) Date of Patent: Mar. 29, 2022

(54) TECHNIQUE FOR FAST JOIN PROCESSING OF DICTIONARY ENCODED KEY COLUMNS IN RELATIONAL DATABASE SYSTEMS

(71) Applicant: Oracle International Corporation, Redwood Shores, CA (US)

(72) Inventors: Chinmayi Krishnappa, San Mateo, CA (US); Jim Kearney, Cambridge, MA (US); Weiwei Gong, Belmont, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/015,421

(22) Filed: Sep. 9, 2020

(65) Prior Publication Data

US 2021/0073221 A1 Mar. 11, 2021

Related U.S. Application Data

(60) Provisional application No. 62/897,742, filed on Sep. 9, 2019.

(51) Int. Cl.
*G06F 17/30* (2006.01)
*G06F 16/2455* (2019.01)
(Continued)

(52) U.S. Cl.
CPC ........ *G06F 16/2456* (2019.01); *G06F 9/3887* (2013.01); *G06F 16/24544* (2019.01); *G06F 16/284* (2019.01); *G06F 40/157* (2020.01)

(58) Field of Classification Search
CPC ........ G06F 16/13; G06F 16/24; G06F 16/156; G06F 16/2453; G06N 3/00; G06N 5/00; G05B 13/00
See application file for complete search history.

(56) References Cited

U.S. PATENT DOCUMENTS 6,678,674 B1 1/2004 Saeki
7,020,661 B1 3/2006 Cruanes
(Continued)

FOREIGN PATENT DOCUMENTS

WO WO2015099562 A1 7/2015

OTHER PUBLICATIONS

Zhou et al., "Implementing Database Operations Using SIMD Instructions", ACM SIGMOD Jun. 4-6, 2002, Madison, Wisconsin, USA, 12 pages.

(Continued)

*Primary Examiner* — Hung D Le
(74) *Attorney, Agent, or Firm* — Hickman Becker Bingham Ledesma LLP; Brian N. Miller

(57) ABSTRACT

For join acceleration, a computer stores local encoding dictionaries (ED), including a build ED that contains a plurality of distinct build dictionary codes (DC) and a probe ED that contains a plurality of distinct probe DCs that is not identical to the plurality of distinct build DCs (BDC). Build data rows (DR) that contain a build key that contains BDCs from the plurality of distinct BDCs is stored. Probe DRs that contain a probe key that contains probe DCs from the plurality of distinct probe DCs is stored. A request for a relational join of the build DRs with the probe DRs is received. The BDCs from the build key and the probe DCs from the probe key are transcoded to global DCs (GDC) of a global ED. Based on GDCs for the build key, a build array whose offsets are respective GDCs of the global ED is populated. Based on GDCs for the probe key, offsets of the build array are accessed. A response to the request for the relational join that is based on accessing offsets of the build array is sent.

20 Claims, 7 Drawing Sheets

(51) Int. Cl.
    *G06F 16/2453* (2019.01)
    *G06F 9/38* (2018.01)
    *G06F 40/157* (2020.01)
    *G06F 16/28* (2019.01)

(56) References Cited

U.S. PATENT DOCUMENTS

| | | | |
|---|---|---|---|
| 10,162,678 | B1 | 12/2018 | Stafford |
| 10,545,917 | B2 | 1/2020 | Dageville et al. |
| 2006/0117036 | A1 | 6/2006 | Cruanes et al. |
| 2010/0088309 | A1 | 4/2010 | Petculescu |
| 2010/0250517 | A1 | 9/2010 | Bendel |
| 2010/0328115 | A1* | 12/2010 | Binnig ............... G06F 16/24561 341/51 |
| 2011/0213766 | A1 | 9/2011 | Hong |
| 2013/0262703 | A1* | 10/2013 | Dong ................... H04L 43/026 709/247 |
| 2013/0318067 | A1 | 11/2013 | Sukhwani et al. |
| 2014/0067791 | A1 | 3/2014 | Idcula |
| 2014/0085115 | A1* | 3/2014 | Beier .................. H03M 7/6023 341/106 |
| 2014/0172827 | A1 | 6/2014 | Nos |
| 2015/0039626 | A1 | 2/2015 | Sen et al. |
| 2015/0277917 | A1* | 10/2015 | Chavan ............... H03M 7/6017 712/7 |
| 2015/0324480 | A1* | 11/2015 | Schreter ................ G06F 16/951 707/741 |
| 2015/0379299 | A1 | 12/2015 | Klein |
| 2016/0103880 | A1 | 4/2016 | Attaluri |
| 2016/0112064 | A1* | 4/2016 | Dalton .................. G06F 3/0644 341/106 |
| 2016/0147820 | A1* | 5/2016 | Schreter ............... G06F 9/5016 707/693 |
| 2016/0378833 | A1 | 12/2016 | Chainani |
| 2017/0024435 | A1* | 1/2017 | Kociubes ........... G06F 16/2453 |
| 2017/0053010 | A1 | 2/2017 | Beyer |
| 2017/0064330 | A1* | 3/2017 | Li ......................... H04N 19/50 |
| 2017/0255675 | A1* | 9/2017 | Chavan ..................... G06F 7/24 |
| 2018/0081939 | A1 | 3/2018 | Hopeman et al. |
| 2018/0081946 | A1 | 3/2018 | Bondalapati et al. |
| 2018/0089261 | A1 | 3/2018 | Li |
| 2019/0197159 | A1 | 6/2019 | Balkesen et al. |
| 2019/0303482 | A1 | 10/2019 | Balkesen et al. |
| 2021/0081410 | A1 | 3/2021 | Chavan |
| 2021/0081417 | A1 | 3/2021 | Chavan |

OTHER PUBLICATIONS

Zhang et al., "Strategies for Using Additional Resources in Parallel Hash-based Join Algorithms", dated 2004, 10 pages.

Martin et al., "Parallel Hash-Based Join Algorithms for a Shared-Everything Environment", dated Sep. 23, 1996, 43 pages.

Alcantara et al., "Real-Time Parallel Hashing on the GPU", dared 2009, 9 pages.

Li, U.S. Appl. No. 15/713,365, filed Sep. 22, 2017, Notice of Allowance, dated Oct. 3, 2019.

Wang, Wendy, et al., "Investigating Memory Optimization of Hash-Index for Next Generation Sequencing on Multi-Core Architecture", 2012 IEEE 26th IP&DPSW, pp. 665-674, downloaded May 13, 2021, 10 pgs.

\* cited by examiner

TECHNIQUE FOR FAST JOIN PROCESSING OF DICTIONARY ENCODED KEY COLUMNS IN RELATIONAL DATABASE SYSTEMS

BENEFIT CLAIM; RELATED CASE

This application claims the benefit of Provisional Appln. 62/897,742, filed Sep. 9, 2019, the entire contents of which is hereby incorporated by reference as if fully set forth herein, under 35 U.S.C. § 119(e). Incorporated herein in its entirety is related U.S. patent application Ser. No. 17/018,018 "ACCELERATED BUILDING AND PROBING OF HASH TABLES USING SYMMETRIC VECTOR PROCESSING" filed Sep. 11, 2020 by Shasank Kisan Chavan et al.

FIELD OF THE INVENTION

The present invention relates to relational join acceleration. Herein are database techniques that join row sets based on dictionary encoding codes.

BACKGROUND

Join queries are widespread in relational database management systems (RDBMS). Join queries combine rows from two or more database tables based on a set of related join key columns. Herein, a join key may be a column, such as in a relational table or column family, that participates in the predicate of a relational join such as an equijoin. The join key may or may not be a candidate key, which uniquely identifies rows such as a primary key, of a database table that contains the column or of any other database table or part of a compound candidate key. A join, such as a relational join, of two database tables, such as relational tables, may occur in two phases, with one respective phase per table. The first phase is a build phase, and its database table is known herein as a build table. The second phase is a probe phase, and its database table is known herein as a probe table. Such a join can be carried out by building some columns of the build table into a data structure during the build phase based on the join key of the build table known herein as a build key. Subsequently the join key column of the probe table is used to probe the data structure for matches during a probe phase. For example, a hash join populates a hash table during the build phase by applying a hash function to the build key values and then probes the hash table for matching join key values during a probe phase based on hashing values of the join key of the probe table, known herein as a probe key.

Especially with an in-memory columnar database, the join key column of the build and probe tables may be compressed or otherwise specially encoded. The build and probe key columns belong to different tables, and those key columns can be compressed or encoded in same or different ways. A join query involving in-memory tables can require decoding the join key columns before the join key values can be added to a join data structure during the build phase. The join key column of the probe table also needs to be decoded, and the probe operation involves expensive data comparisons of decoded values. Thus with other approaches, a relational join based on encoded or compressed join keys is at least as slow as other joins and potentially even slower due to decoding and possibly re-encoding.

With other approaches, query operations may entail direct or hashed usage of a join key such as a primary key, a foreign key, or a hashed join key. Hashing is prone to collisions when distinct values incidentally share a same hash code. Using raw values of such keys that are not hashed may entail sparse values such as text strings that are expensive to compare.

In any case hashed or not, sparse values or sparse hash codes are unsuited as array offsets because a range of distinct sparse values may contain large and/or many gaps that would greatly inflate the size of an array and leave much of the capacity of the oversized array unused. Without an array, resolving a hash collision in a hash table needs linear time. Likewise, a hash function may generate codes that are more sparse even when original values are less sparse, which may be somewhat counterproductive. Techniques to reduce sparsity of hash codes, such as modulus, may increase collisions, which increases latency.

DETAILED DESCRIPTION

Figure 1:
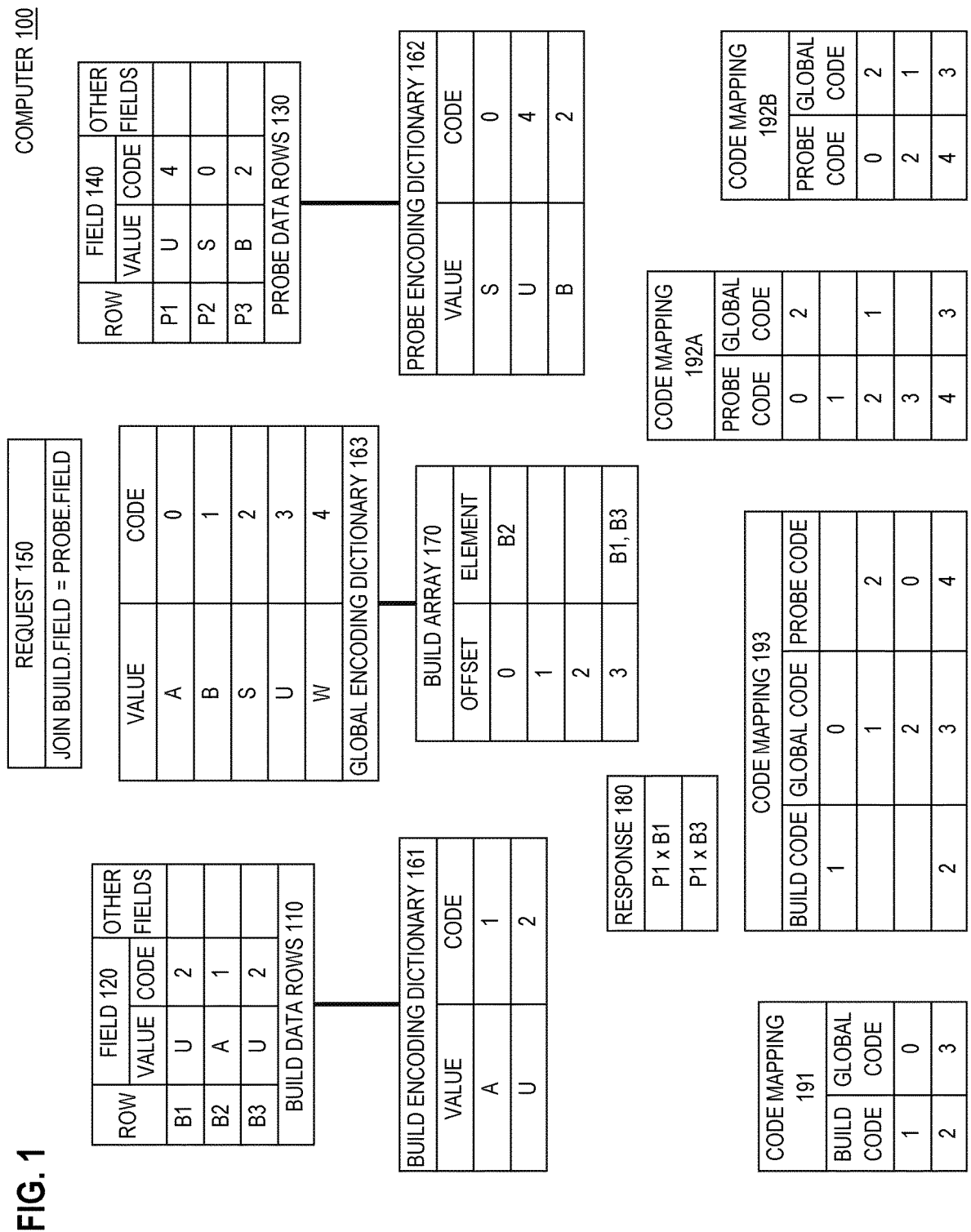
FIG. 1 is a block diagram that depicts an example computer that joins data rows based on dictionary encoding codes.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are novel execution techniques for a relational join based on dictionary encoded join key columns with acceleration. Special aspects presented herein include:
- organization of a join array, known herein as a build array, for indexing by encoding dictionary codes (instead of uncompressed join key values);
- join data structures for limited memory;
- single instruction multiple data (SIMD) for probing and building a join array for acceleration with data parallelism;
- pushing down structured query language (SQL) operations into the probing of a join array for additional acceleration.

Normally, query operations that are arranged above a join operator in a query tree are implemented separately. Herein, because the build or probe of the join is itself so fast, some operations, such as COUNT(*) and aggregation operations such as SUM( ), can be fused (i.e. combined) into the probe operation itself. Such extra computation is hidden by memory latency for the fetch of the join array element being accessed. Such push-down requires more specialization of the code, so that each possible control flow path is finely optimized. Unlike other approaches, frequency of dictionary codes are detected herein to perform a join at a same high speed, regardless of whether the join entails 1-to-1 matching or many-to-1.

With an in-memory global dictionary, dictionary codes of respective key columns of the build and probe tables can be transcoded with a single global dictionary. The techniques described herein take advantage of this shared dictionary to greatly reduce the join cost by skipping expensive decode and memory comparison operations.

When the build and probe key columns use an in-memory global dictionary, the build and probe key columns are encoded using the same shared dictionary during population and probing of a join array. As a result, key column dictionary codes can be used directly during the join, and only the subset of dictionary codes that are required for projection are materialized. By doing away with decoding and memory comparisons for unencoded key values and by delaying materialization to a final projection stage, the cost of the join is greatly reduced.

Most of the join work, and in some cases, the entire join operation, is performed using only the global dictionary codes. Join algorithms introduced herein enable fast performance by avoiding decoding and expensive comparisons of unencoded key values, using fast and compact data structures, and by offering specialized optimizations.

Because dictionary codes are directly processed, highly efficient, and space optimal, join data structures for dictionary encoded columns are presented herein. Several special cases are optimized, such as COUNT(*) queries, queries where build columns are not projected, and queries involving distinct build key values. For example, for a COUNT(*) query, only the frequency is recorded for each build code seen during the probe phase. Furthermore, if the build key column has no duplicates, only a single bit per code is needed to record the frequency. Additionally, working with dictionary codes facilitates leveraging SIMD to speed up various join operations as discussed herein.

In an embodiment, a computer stores local encoding dictionaries, including a build encoding dictionary that contains a plurality of distinct build dictionary codes and a probe encoding dictionary that contains a plurality of distinct probe dictionary codes that is not identical to the plurality of distinct build dictionary codes. Build data rows that contain a build key that contains build dictionary codes from the plurality of distinct build dictionary codes are stored. Probe data rows that contain a probe key that contains probe dictionary codes from the plurality of distinct probe dictionary codes are stored. A request for a relational join of the build data rows with the probe data rows is received. The build dictionary codes from the build key and the probe dictionary codes from the probe key are transcoded to global dictionary codes of a global encoding dictionary. Based on global dictionary codes for the build key, a build array whose offsets are respective global dictionary codes of the global encoding dictionary is populated. Based on global dictionary codes for the probe key, offsets of the build array are accessed. A response to the request for the relational join that is based on accessing offsets of the build array is sent.

1.0 Example Computer

FIG. 1 is a block diagram that depicts an example computer 100, in an embodiment. Computer 100 joins data rows 110 and 130 based on dictionary encoding codes. Computer 100 may be at least one rack server such as a blade, a personal computer, a mainframe, a virtual computer, or other computing device. When computer 100 comprises multiple computers, the computers are interconnected by a communication network.

In various embodiments, computer 100 provides access to a bulk datastore such as a relational database, a graph database, a NoSQL database, a column datastore, a tuple datastore such as a resource description framework (RDF) triplestore, a key value datastore, or a document datastore such as for documents that contain JavaScript object notation (JSON) or extensible markup language (XML). In any case, the datastore may be managed by software such as an application or middleware such as a database management system (DBMS). Data stored in the datastore may reside in volatile and/or nonvolatile storage.

In this example, data is organized as fields such as 120, 140, and other fields as shown. In this example, fields may have a tabular arrangement that is logical and/or physical such that fields are arranged as one record per row and one field per column. For example, data rows 110 and 130 may each be a relational table, a column family, or an internal row set such as an intermediate result. For example, build data rows 110 contains rows B1-3.

A-B, S, and U are example unencoded values in the value column of fields 120 and 140. The value column of fields 120 and 140 is demonstrative and not actually stored. Although shown as raw values that are unencoded, fields 120 and/or 140 are instead stored in volatile and/or nonvolatile storage as dictionary encoded as shown in the code columns of fields 120 and 140 according to respective encoding dictionaries 161-162 that bidirectionally map raw values to codes, a.k.a.: dictionary codes, encoding codes, dictionary keys, or encoding keys, not to be confused with a join key such as a build key or a probe key, nor a candidate key such as a primary key, although a candidate key or a join key may contain dictionary codes.

Within a same encoding dictionary, each code is distinct and has a same fixed size. In this example as shown, encoding dictionaries 161-163 contain codes and values that demonstrate various scenarios. All of encoding dictionaries 161-163 contain a different respective code for same unencoded value U. All of encoding dictionaries 161-163 map a different respective unencoded value to same code 2. All of encoding dictionaries 161-163 contain different respective amounts of codes and values.

Also in this example as shown, the codes of encoding dictionaries 161-162 are respectively one and zero based. The codes of encoding dictionaries 161-162 are respectively sequential and not sequential. The codes of encoding dictionaries 161-162 are respectively continuous and discontinuous. The unencoded values of encoding dictionaries 161-162 are respectively naturally (e.g. alphabetically) sorted and unsorted. As discussed later herein, sorting and/or continuity of codes and/or values provides various efficiencies.

In other examples not shown, encoding dictionaries 161-163 may have other distributions of codes and values. For example, some or all of encoding dictionaries 161-163 may have partially overlapping distributions of codes and values. In some examples, one or both of encoding dictionaries 161-162 may precisely contain a subset of the contents of global encoding dictionary 163. In some examples, global encoding dictionary 163 may contain a union or intersection of contents of encoding dictionaries 161-162.

In other words, approaches herein have significant flexibility as to contents of encoding dictionaries 161-163. Tolerance of discrepant encoding dictionaries facilitates relational joins in various meaningful scenarios as discussed later herein and in the following example.

In operation, computer 100 receives or generates request 150 to read and/or write data in the datastore. In embodiments, request 150 is expressed as data manipulation language (DML) such as a create read update delete (CRUD) statement or query by example (QBE). For example, request 150 may be a structured query language (SQL) DML statement such as a query. In an embodiment, request 150 is received through open database connectivity (ODBC).

Depending on the example, request 150 may directly specify as shown a relational join between data rows 110 and 130 or otherwise cause such a join to implicitly occur such as by invoking a database view or stored procedure whose implementation includes such a join. Although a single field equijoin is shown, other joins are possible such as a join based on multiple fields, inequality, and/or including null. As shown, request 150 specifies "build.field=probe.field" that entails a join of data rows 110 and 130 based on equality of fields 120 and 140.

Computer 100 executes a join for request 150 in a build phase followed by a probe phase. The build phase populates build array 170 based on build data rows 110 such that field 120 is already encoded according to build encoding dictionary 161. Thus during join execution, content of field 120 is available as codes 1-2 instead of values A and U.

The build phase entails iterating through entries in field 120. For example, build data rows 110 may be a relational table whose rows B1-B3 are iterated during a table scan to access content of field 120. In another example, field 120 is available as a one-dimensional vector such as in random access memory (RAM). Thus, it does not matter whether build data rows 110 are available in row major or column major form.

In any case, the build phase enumerates field 120 values U, A, U as a sequence of codes 2, 1, 2 for respective rows B1-3. Each code occurrence in that sequence is an opportunity to assign or revise an element in build array 170 as explained later herein. Elements in build array 170 are located by array offset as shown by the offset column that is accessed according to the codes in field 120 after translation to the codes of global encoding dictionary 163 as follows.

Each offset into build array 170 corresponds to a distinct, ordered, and continuous code in global encoding dictionary 163 even though neither of fields 120 and 140 are encoded with global encoding dictionary 163. Thus, the sequence of integers in the code column of global encoding dictionary 163 is identical or, as shown, a superset of the distinct, ordered, and continuous integers in the offset column in build array 170. To conserve space and/or time, the shown embodiment of build array 170 lacks offsets that exceed the highest global code for field 120, field 140, build encoding dictionary 161, and/or probe encoding dictionary 162. For example even when encoding dictionaries 161-163 are identical, data rows 110 and/or 130 may have been generated by filtration such as by applying a filter predicate such as to be intermediate results before joining such that encoding dictionary 161 and/or 162 contain many codes that were filtered away from data rows 110 and/or 130. Either or both of the code column of global encoding dictionary 163 and the offset column in build array 170 may be implied and not actually stored.

During the build phase, rows B1-3 are processed as follows. For demonstration, such processing is presented as sequential. Parallel processing is discussed later herein. When a row of build data rows 110 is processed, the code of field 120 of the row is transcoded to a code of global encoding dictionary 163 as follows. The row is processed with build array 170 based on that code of global encoding dictionary 163.

Transcoding may have various embodiments that entail one or more maps such as code mappings 191, 192A-B, and 193 that are presented as complementary and/or alternatives that demonstrate various configurations and scenarios as follows. Although FIG. 1 shows code mappings 191, 192A-B, and 193, most embodiments of computer 100 need and have only a subset of code mappings 191, 192A-B, and 193. For example and as explained later herein, an embodiment may only have code mapping 193.

A straightforward example is code mapping 191 that bi-directionally maps between codes of encoding dictionaries 161 and 163. In a same row of code mapping 191 are codes that represent a same unencoded value. For example, the first row of code mapping 191 indicates that build code 1 maps to global code 0, both of which represent unencoded value A.

In an embodiment, code mapping 191 is a lookup table such that a build code may be directly used as a row offset into code mapping 191 for random access in constant time to look up a global code. In the opposite direction, using code mapping 191 as a lookup table to transcode from global code to build code may entail linear or binary searching of the global code column.

In another embodiment, code mapping 191 is an associative structure that is not a lookup table, such as a bidirectional hash table for random access in constant time. In other words, various implementations of code mapping 191 may have various temporal performances in either translation direction. Code mappings 192A-B and 193 also may have various embodiments with various performance characteristics.

For transcoding between probe codes and global codes, code mapping 192A may operate similarly to the lookup table embodiment of code mapping 191 discussed above. Blank cells in code mappings 192A and 193 represent codes that are both undefined and unused. For example in field 140 and probe encoding dictionary 162, code 1 never occurs, which is why probe code 1 in code mapping 192A does not map to a global code.

Code mapping 192B does not contain undefined cells and may be used instead of code mapping 192A. In an embodiment, code mapping 192B is similar to the bidirectional hash table embodiment of code mapping 191. In another embodiment, code mapping 192B is similar to code mapping 192 except that linear or binary searching is needed as discussed above for code mapping 191.

Code mapping 193 is presented for reverse lookup from global code to build code and/or probe code such that, in a lookup table embodiment, a global code may be directly used as a row offset for random access in constant time as discussed above for code mapping 191. In an embodiment, code mapping 193 can map in three directions such that any one of the three columns of code mapping 193 may be used for looking up translations to any of the other columns of code mapping 193.

In other words, approaches herein have significant flexibility as to format and usage of one or multiple code mappings. For example, processing field 120 may use one code mapping, and processing field 140 may use a same or different code mapping. Likewise, transcoding in one direction may use one code mapping, and transcoding in the opposite direction may use a same or different code mapping.

The lifecycle of a code mapping may depend on the embodiment. For example, a code mapping may be generated before or after receiving request 150 and may be discarded or retained for reuse after generating response 180 that is presented later herein. In any case and in any embodiment, computer 100 can use code mapping(s) or other translation mechanisms to bidirectionally translate between any two of a build code, a probe code, and a global code, which may facilitate a relational join based on build array 170 such as follows.

For example when the build phase encounters build code 2 for row B1 during population of build array 170, build code 2 is transcoded to global code 3, and the element at offset 3 in build array 170 becomes assigned. Such assignment may entail storing, at that offset, an element value that depends on the embodiment and example such as presented later herein. In the shown example, the assigned element value is the row identifier, which is B1 for this row.

In other examples, the assigned element value may be: a) a Boolean that indicates that global code 3 occurs at least once for field 120, orb) a count of how many times does global code 3 occur for field 120. In this example, global code 3 occurs again for row B3 and causes row identifier B3 to be appended to an ordered or unordered set of occurrences of global code 3 in build array 170. When the build phase finishes, contents of the element column are as shown. Thus in this example, each element of build array 170 contains a list of zero or more row identifiers for rows that have a same global code for field 120. When the build phase finishes, population of build array 170 is complete, and the probe phase may start.

In an embodiment, transcoding exceptions are tolerated by ignoring offending rows. For example, a row is excluded (i.e. not processed) if the row's code to be transcoded is absent in an involved code mapping. For example, build data rows 110 might have had an unshown row B4 having unencoded value C for field 120 that is undefined in encoding dictionary 161 and/or 163. Thus, row B4 does not participate in the join. In one embodiment, global encoding dictionary 163 is the intersection of encoding dictionaries 161-162 such that rows whose codes are not in all three of encoding dictionaries 161-163 are excluded from the join. For example, code mappings 192A and 193 have blank cells as explained above. In an embodiment, an exception is raised if either of encoding dictionaries 161-162 contains an unencoded value that global encoding dictionary 163 does not contain.

In any case, the probe phase matches rows of probe data rows 130 to rows of build data rows 110 by matching, in build array 170, global dictionary codes for field 140 to same global dictionary codes for field 120 as follows. The probe phase enumerates field 140 values U, S, B as a sequence of probe codes 4, 0, 2 for respective rows P1-3. Each code occurrence in that sequence, after transcoding to a global code as discussed above, is an opportunity to match an element in build array 170. Probe codes of field 140, like build codes of field 120, are transcoded into respective global codes that are used as offsets into build array 170 to access an element. For example, value U of row P1 has probe code 4 that translates to global code 3, which matches the element at offset 3 in build array 170.

Other join approaches may entail linear scanning during the build phase and/or the probe phase, which is slow. Techniques herein do not linearly scan, but instead use global dictionary codes as array offsets for random access. Thus, joins herein are accelerated.

As explained above, an element of build array 170 may be a scalar or a set such as a list as shown. A probe code that matches an element that has a set may cause matching of the same probe row to each element in the set. For example, the join results are shown as response 180 that contains pairings of an identifier of a row of build data rows 110 with an identifier of a row of probe data rows 130.

For example, probe row P1 involves global code 3 that, per build array 170, matches build rows B1 and B3 that involve same global code 3. Thus, response 180 contains P1×B1 and P1×B3. In this example, response 180 is a final result that answers request 150 and contains the join results. In another example, the join results are an intermediate result, and response 180 is based on, but does not contain, the join results.

In various examples, the elements of build array 170, the join results, and response 180 may entail various amounts of materialization such as projection. For example, some of the other fields of data rows 110 and 130 may be payload columns that may or may not be included in the join result and/or response 180. Some of the other fields of build data rows 110 may or may not be included in elements of build array 170.

So long as row identifiers or primary key values are included in the join result and/or in the elements of build array 170, materialization of payload columns may be deferred until various later stages of execution of request 150. For example, all payload columns may be unmaterialized until response 180 is generated. Join results may contain row identifiers of build data rows 110 and/or row identifiers of probe data rows 130, or neither.

Implementation of row identifiers depends on the embodiment. Such implementations may include: a) more or less persistent ROWIDs such as physical storage identifiers or locators, b) volatile pointers such as memory addresses or array offsets, c) dictionary codes, which may or may not be array offsets, or d) candidate key values that are simple or compound such as primary key values. Different row sets may have different row identifier implementations.

For example, a durable table may have ROWIDs with an embedded disk block number such as a logical block address (LBA) and byte offset, while a volatile table such as for intermediate results may instead use pointers as row identifiers. If memory addresses are aligned as discussed later herein, then least significant bits of pointers may be truncated such that unused bits are implied and: a) repurposed for bitfields with non-addressing semantics, or b) not stored such as for bit packing multiple pointers into less space.

In an embodiment, a volatile row identifier is valid only until the row is evicted from cache. For example when the row is later reloaded into cache in a same database session, the row is reassigned a different volatile row identifier. In an embodiment, a persistent row identifier is only somewhat permanent. For example, compaction of a durable table may cause a persistent row to move from one disk block to another, which may reassign a different ROWID to the row. Approaches to materialization and row identification are further discussed in related U.S. patent application Ser. No. 17/018,018 "ACCELERATED BUILDING AND PROBING OF HASH TABLES USING SYMMETRIC VECTOR PROCESSING".

2.0 Example Dictionary-Encoded Join Process

Figure 2:
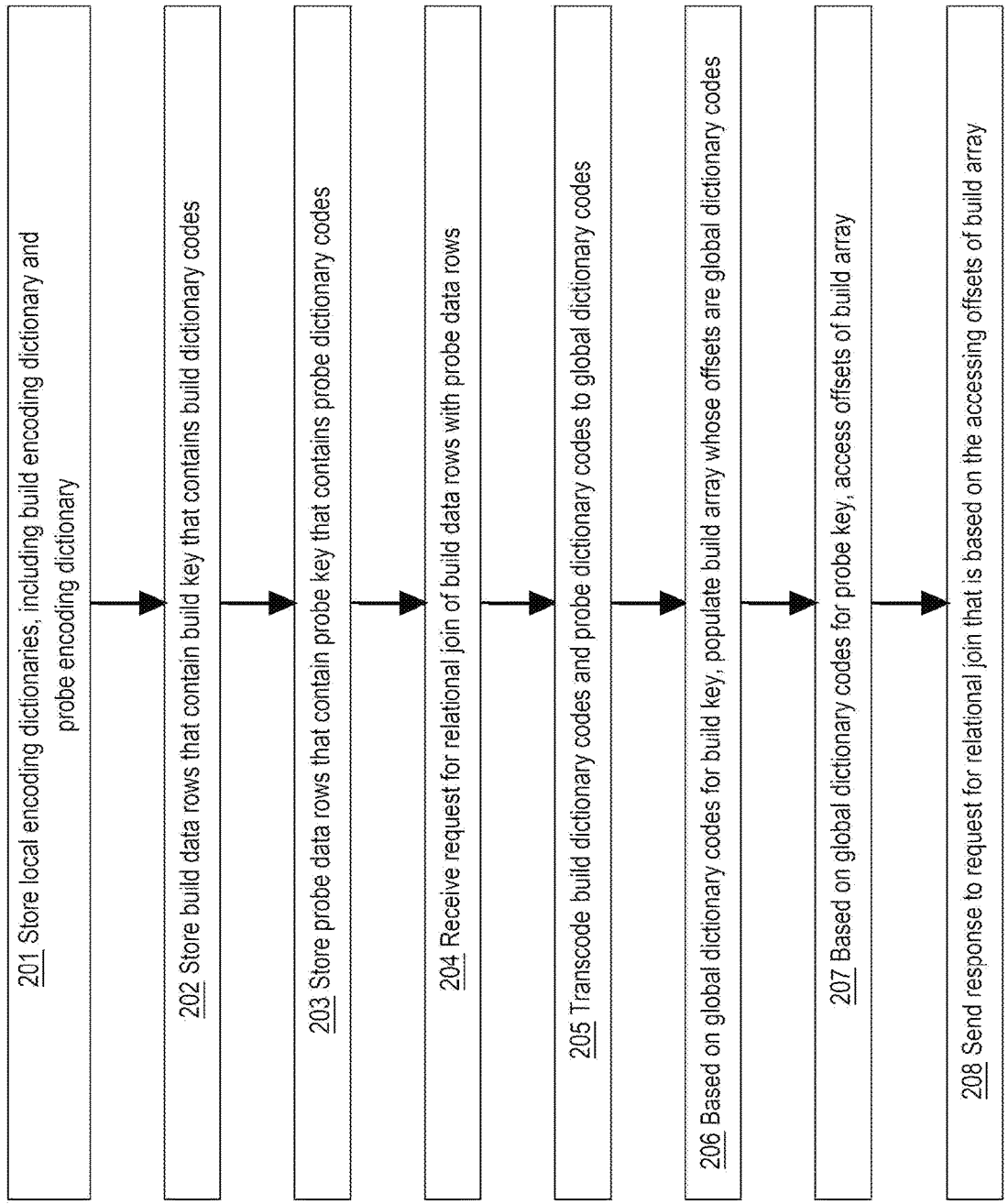
FIG. 2 is a flow diagram that depicts an example process that joins data rows based on dictionary encoding codes.

FIG. 2 is a flow diagram that depicts an example process that joins data rows 110 and 130 based on global encoding dictionary codes. FIG. 2 is discussed with reference to FIG. 1. Computer 100 performs steps 201-208 as follows. Some of those steps may be combined and/or performed in an ordering other than shown.

Encoding dictionaries 161-162, but not global encoding dictionary 163, are known herein as local encoding dictionaries for reasons discussed later herein. Step 201 stores local encoding dictionaries, including at least encoding dictionaries 161-162. In one example, data rows 110 and 130 may be originally available as respective relational tables of a DBMS of computer 100 that have respective table indices. Step 201 may scan those indices to discover the distinct unencoded values of data rows 110 and 130 even before data rows 110 and 130 are loaded into volatile memory from their respective relational tables.

In another example, the DBMS may discover those distinct unencoded values during a table scan that may be needed to load data rows from a relational table. The DBMS may generate local encoding dictionaries 161-162 based on the distinct unencoded values such as by zero or one based enumeration of codes. In another example, local encoding dictionaries 161-162 already exist, and discovery of distinct unencoded values is unnecessary.

Step 202 stores build data rows 110 that contains field 120 as a build key that contains build dictionary codes. For example, step 202 may load build data rows 110 into volatile memory from a relational table on disk. In the relational table on disk, field 120 contains unencoded values. Whereas same field 120 in build data rows 110 in volatile memory should instead contain build codes. During loading, step 202 encodes field 120 based on encoding dictionary 161. In another example, field 120 is already dictionary encoded on disk, and step 202 does not perform encoding.

Step 203 stores probe data rows 130 that contains field 140 as a probe key that contains probe dictionary codes. Step 203 may otherwise be more or less similar to step 202 such that during loading, step 203 encodes field 140 based on encoding dictionary 162.

In one scenario, steps 201-203 occur while executing an earlier database query that is not request 150. For example, data rows 110 and 130 may reside in a least recently used (LRU) cache in volatile memory for possible eventual reuse such as by request 150 as follows. Thus in some cases, an arbitrary duration may separate steps 203-204, and step 203 may or may not be the cause of step 204.

Step 204 receives request 150 for a relational join of build data rows 110 with probe data rows 130 that are encoded with discrepant respective local encoding dictionaries. Step 204 causes remaining steps 205-208 as follows.

Step 205 transcodes build dictionary codes and probe dictionary codes to global dictionary codes as described earlier herein. In many or most embodiments, step 205 occurs partly during the build phase and partly during the probe phase. For example, respective halves of step 205 may be combined with steps 206-207 such that build codes are transcoded during step 206 and probe codes are transcoded during step 207. For example in a sequential embodiment, a previous build code is transcoded and then processed by step 206 before a next build code is transcoded and processed.

Steps 206-207 respectively occur during the build phase and the probe phase as follows. Based on global dictionary codes for field 120 as a build key, step 206 populates build array 170 whose offsets are global dictionary codes. Step 206 uses global codes for random access into build array 170. Contents and population of build array 170 are discussed earlier and later herein.

Based on global dictionary codes for field 120 as a build key, step 206 populates build array 170 whose offsets are global dictionary codes. Step 206 may process rows of build data rows 110 individually and sequentially or, as described later herein, in parallel. Step 206 uses global codes of field 120 for random access into build array 170. Random access means without linear scanning of offsets in build array 170. Unless duplicate build key value occurrences need separate recording, as discussed later herein, step 206 occurs in constant time for a current row of build data rows 110 and in linear time for all of build data rows 110. In an embodiment discussed later herein, even separate recording of an individual duplicate occurs in constant time. When step 206 finishes, build array 170 is fully populated as shown and as discussed earlier and later herein.

Based on global dictionary codes for field 140 as a probe key, step 207 access offsets of build array 170. Step 207 performs matchmaking such that probe data rows 130 are respectively correlated with build data rows 110 based on build array 170. Accumulation of such matches is discussed later herein. Step 207 may process rows of probe data rows 130 individually and sequentially or, as described later herein, in parallel. Step 207 uses global codes of field 140 for random access into build array 170. Random access means without linear scanning of offsets in build array 170. Step 207 occurs in constant time for a current row of probe data rows 130 and in linear time for all of probe data rows 130.

Some straightforward example scenarios of matchmaking are as follows. In one scenario, request 150 asks if the join results are empty such as with SQL EXISTS. In that case step 207 finishes when a first match is found or probe data rows is fully processed without finding a match. For example, probe rows P2-P3 do not cause matches because their respective global codes 2 and 1 are offsets in build array 170 that lack elements. However, probe row P1 does match. Thus as soon as step 207 processes probe row P1, step 207 may finish without processing remaining rows of probe data rows 130.

In another scenario, request 150 asks how many rows are in the join results such as with SQL COUNT. In that case, step 207 increments a counter for each time a row of probe data rows 130 causes a match in build array 170. Neither of these two scenarios entails projection of a join key or other fields into the join results or response 180. Activities such as grouping, sorting, projecting, and elimination of duplicates are discussed later herein.

For request 150, step 208 sends response 180 that is based on the matchmaking by step 207. As discussed earlier herein, response 180 contains or is otherwise based on the join results and may or may not entail additional processing such as filtering and projection such as discussed later herein.

3.0 Multiple Encoding Dictionaries

The following Table 1 contains example encoding configurations, some or all of which may be incorporated into computer 100 in various embodiments.

| Encoding Configuration | Meaning |
| --- | --- |
| 211 | Build key and probe key are encoded with separate encoding dictionaries |
| 212 | Build rows or probe rows partitioned into memory chunks |
| 213 | Memory chunks are encoded by different respective encoding dictionaries |
| 214 | Same unencoded value has different respective code in different respective encoding dictionaries |
| 215 | Different respective encoding dictionaries contain different respective amounts of codes |

As discussed earlier herein, join key values of build data rows 110 may be encoded with one encoding dictionary, and join key values of probe data rows 130 may be encoded with another encoding dictionary per encoding configuration 211.

Horizontally partitioning build data rows 110 or probe data rows 130 into memory chunks per encoding configuration 212 may encourage discrepant encoding dictionaries per encoding configuration 213 as follows. For example, an in memory compression unit (IMCU) may be a cacheable unit that contains a subset of build data rows 110 or probe data rows 130, as whole rows or as a vertical slice of some column(s). For example, same data may be persisted in row major format, and cached IMCUs may instead have column major format.

Each IMCU may have its own local encoding dictionary that: a) is created when the IMCU is populated, b) is stored in the IMCU, c) is used to encode a join key column for the rows in the IMCU, d) contains only codes for values that occur in the IMCU, and/or e) maps codes to values without regard to other IMCUs nor other encoding dictionaries. For example, a same unencoded value of a join key may occur for multiple IMCUs that partition a same row set, and that same value may map to different codes in local encoding dictionaries of different IMCUs per encoding configuration 214. A value may occur in one IMCU but not another IMCU that partition a same row set, which means that those two IMCUs may have respective local encoding dictionaries that contain different amounts of codes per encoding configuration 215 even when both IMCUs contain a same amount of rows.

4.0 Example Buckets and Indirection

The following Table 2 contains example bucket configurations for build array 170, some or all of which may be incorporated into computer 100 in various embodiments.

| Bucket Configuration | Meaning |
| --- | --- |
| 511 | An element of build array stores pointer or offset for particular build row |
| 512 | Pointer or offset for particular build row comprises logical block address of persistent data block |
| 513 | Pointer or offset for particular build row points to head or tail of linked list that contains second pointer or offset that points to particular row |
| 514 | Pointer for particular build row points to aligned memory segment |

Per bucket configuration 511, an element of build array 170 may store a pointer or array offset. In an embodiment, the pointer contains the memory address of a particular row of build data rows 110. In an embodiment, the offset indicates which row within build data rows 110 or some other array of data rows.

In an embodiment, the pointer or offset is a volatile identifier of the row that is valid until the IMCU is evicted. In an embodiment, the volatile row identifier contains a pointer to the IMCU and an offset of the row within the IMCU. For example, reloading a previously evicted IMCU at a different memory address may invalidate an old pointer to the row or IMCU but might not invalidate an offset of the row within the IMCU.

A pointer to a row may be somewhat persistent. Per bucket configuration 512, the pointer may be a ROWID that contains a logical block address (LBA) of a disk data block. For example, a ROWID may contain an LBA and a row offset or byte offset for the row within the disk block.

An element of build array 170 may record duplicate build codes by storing a pointer or offset that points to a bucket that contains multiple pointers or offsets that point to respective rows of build data rows 110. The bucket may be implemented as an aggregation data structure such as an array or a segmented array that is implemented as a linked list. Per bucket configuration 513, the element of build array 170 may contain a pointer to a head or tail of the linked list.

Per bucket configuration 514, the element of build array 170 may contain a pointer to a memory segment, such as an array, that is aligned in memory. Memory alignment is discussed later herein. Approaches to indirection and segmentation are further discussed in related U.S. patent application Ser. No. 17/018,018 "ACCELERATED BUILDING AND PROBING OF HASH TABLES USING SYMMETRIC VECTOR PROCESSING".

5.0 Example Bitmaps

As discussed earlier herein, a respective bucket or counter may be needed for each distinct build code when duplicate occurrences of a same build code in field 120 are relevant. In other cases, duplicate build codes are either irrelevant, such as for SQL DISTINCT as discussed earlier herein, or do not occur, in which case each element in build array 170 may be a respective bit in a bitmap. In other words, the bitmap has as many bits as build array 170 has offsets, with one bit per offset. Initially, all of the bits in the bitmap are cleared. For each global code that occurs at least once for build data rows 110, the build phase sets the corresponding bit in the bitmap. That is, the global code is used as an index into the individual bits of the bitmap.

Figure 3:
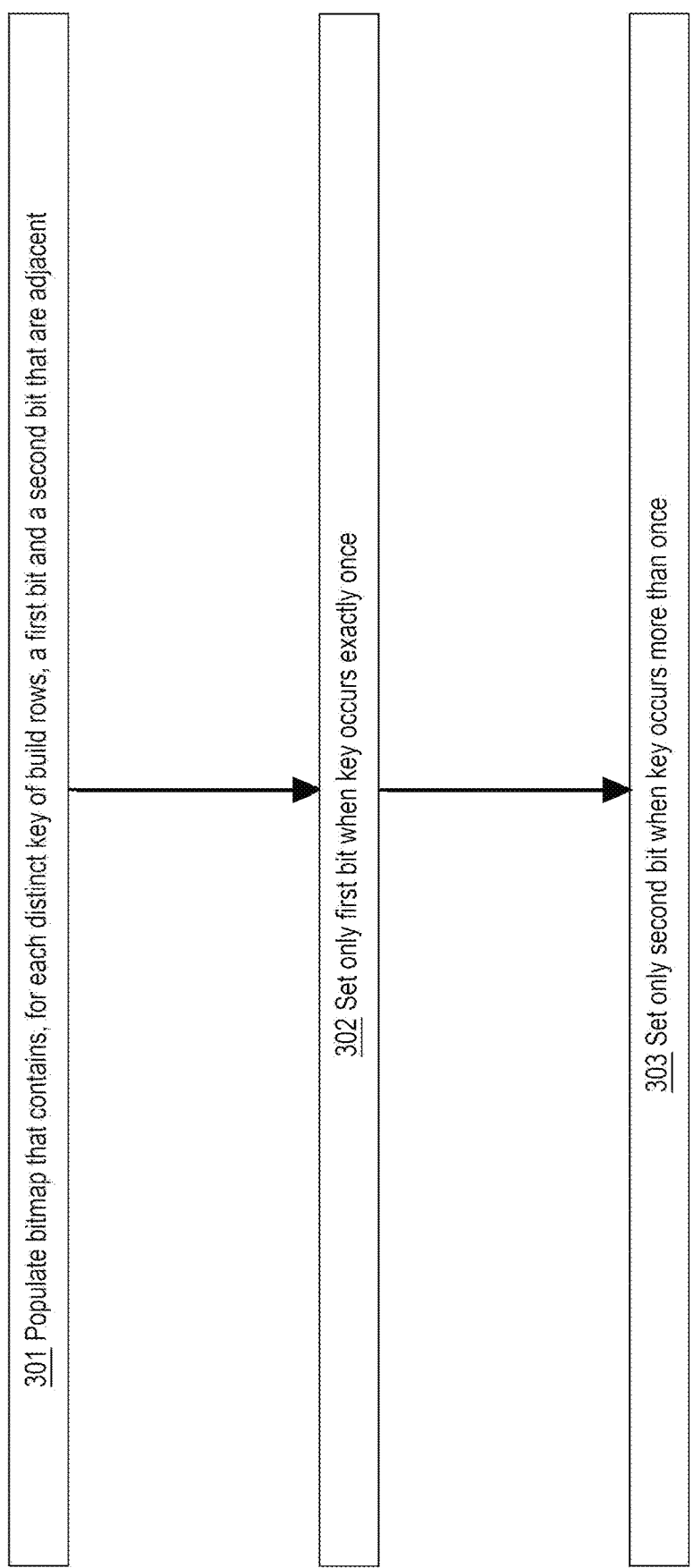
FIG. 3 is a flow diagram that depicts example bitmap activities that may occur during the build phase that populates a build array when duplicates are relevant.

FIG. 3 is a flow diagram that depicts example bitmap activities that may occur during the build phase that populates build array 170 when duplicates are relevant. FIG. 3 is discussed with reference to FIG. 1.

When duplicate build codes are relevant, build step 302 uses multiple adjacent bits in a bitmap for each distinct global code. In other words, each distinct global code has its own bitfield in the bitmap. Individual bits in the bitfield may be used as follows.

Initially, all bits of the bitfield are cleared to indicate that the global code has not occurred for build data rows 110. Upon the first occurrence of the global code for build data rows 110, build step 303 sets the first (e.g. lease significant) bit of the bitfield to indicate that the global code occurs but does not have duplicates. Upon the second occurrence of the same global code, build step 304 clears the first bit and sets the second bit of the bitfield to indicate that the global code has duplicates.

Thus, a field in the bitmap may indicate none, one, or many occurrences of a build key value. The bitmap may accelerate a probe phase of a join as follows. When a build key value has duplicates, those duplicates may be aggregated in a data structure that may have access latency due to navigational issues such as traversing a linked list whose nodes are the individual duplicates. If duplicates are instead stored in an array, the array may be bounded by a size indicator or a null terminating value at the end of the array. Whether the duplicate aggregation is a list or an array, access latency is involved and typically includes at least one occurrence of indirection such as dereferencing a pointer that points to the array. Such access latency is justified for duplicates, but may be unnecessary for a build key value that does not occur or only occurs once, which may be common cases. Thus with the bitmap, attempting to match a probe key value to a build key value that does not occur may occur without any indirection. Likewise, matching a probe key value to a build key value that occurs only once may dereference a pointer that points directly to the sole matching build row, which is impossible if the probe phase is not advised that that build key value has only one occurrence. In cases where build rows are unwanted, such as when only a count is queried or only probe columns are projected, a bitfield value of zero or one may provide sufficient information by itself to complete a probe of the involved probe key value.

6.0 Example Build Phase Activities

Figure 4:
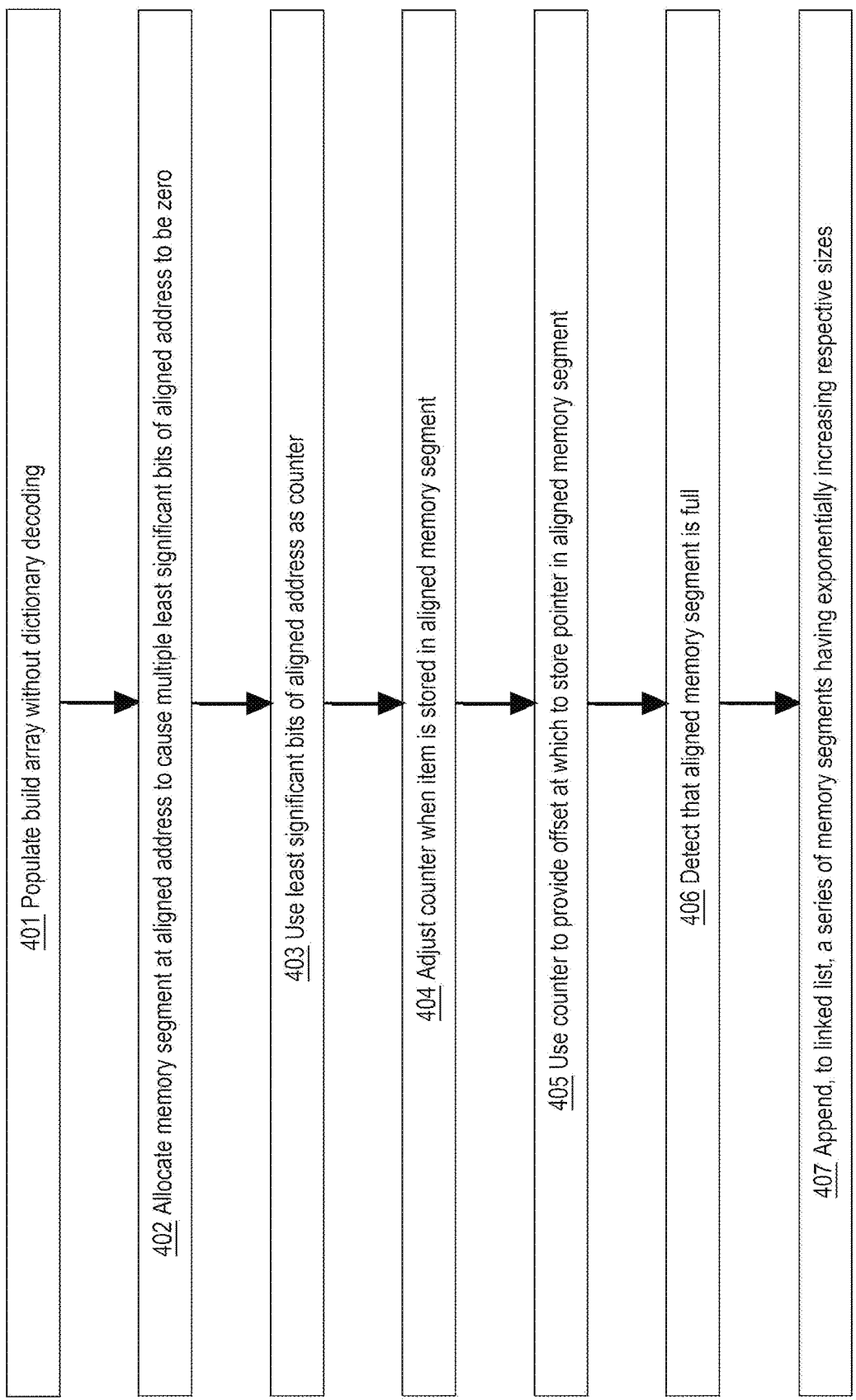
FIG. 4 is a flow diagram that depicts example build activities that may occur during the build phase that populates a build array.

FIG. 4 is a flow diagram that depicts example build activities that may occur during the build phase that populates build array 170. FIG. 4 is discussed with reference to FIG. 1.

Because joins herein are based on transcoding local join codes to global dictionary codes, populating build array 170 occurs without any dictionary decoding during build step 401.

As explained earlier herein, an element of build array 170 may contain a pointer to a bucket that records duplicate occurrences of a same global code. In an embodiment, the bucket has at least one memory segment that contains an array of pointers or offsets of rows of build data rows 110 that have a same build code in field 120. Build step 402 allocates the memory segment at a memory address that is aligned to cause multiple least significant bits of the memory address to be zero.

In other words, the memory segment is aligned at a boundary that is: a power of two, and at least four bytes. Those least significant bits may be implied because they are always zero. Thus, the pointer itself may be truncated and/or multiple pointers may be bit packed together.

Because those zeroed bits are implied, they may be unused. Those unused bits of a pointer may be repurposed as a bitfield. Build step 403 uses that bitfield as a counter. For example, the pointer may point to an array, and the counter may count how many items are currently stored in the array. For example, the array may store pointers to duplicate occurrences for a same global code. Thus, the counter may count duplicates of a same global code.

Various activities may happen whenever there is another occurrence of a same global code during the build phase, such as: a) the pointer bitfield counter is incremented by build activity 404, b) the counter indicates an array offset into the aligned memory segment at which to store a pointer to the current row of build data rows 110 that has the duplicate build code per build step 405, and/or c) overflow of the aligned memory segment is indicated when the counter exceeds a threshold as detected by build step 406; for example, another segment in the bucket's segmented array may be allocated. The segmented array may be a linked list of segments. Build step 407 grows the linked list by adding segments that have exponentially increasing respective sizes. Approaches for duplicates, such as clustered key value indications, and segmentation are further discussed in related U.S. patent application Ser. No. 17/018, 018 "ACCELERATED BUILDING AND PROBING OF HASH TABLES USING SYMMETRIC VECTOR PROCESSING".

7.0 Additional Example Acceleration Activities

Figure 5:
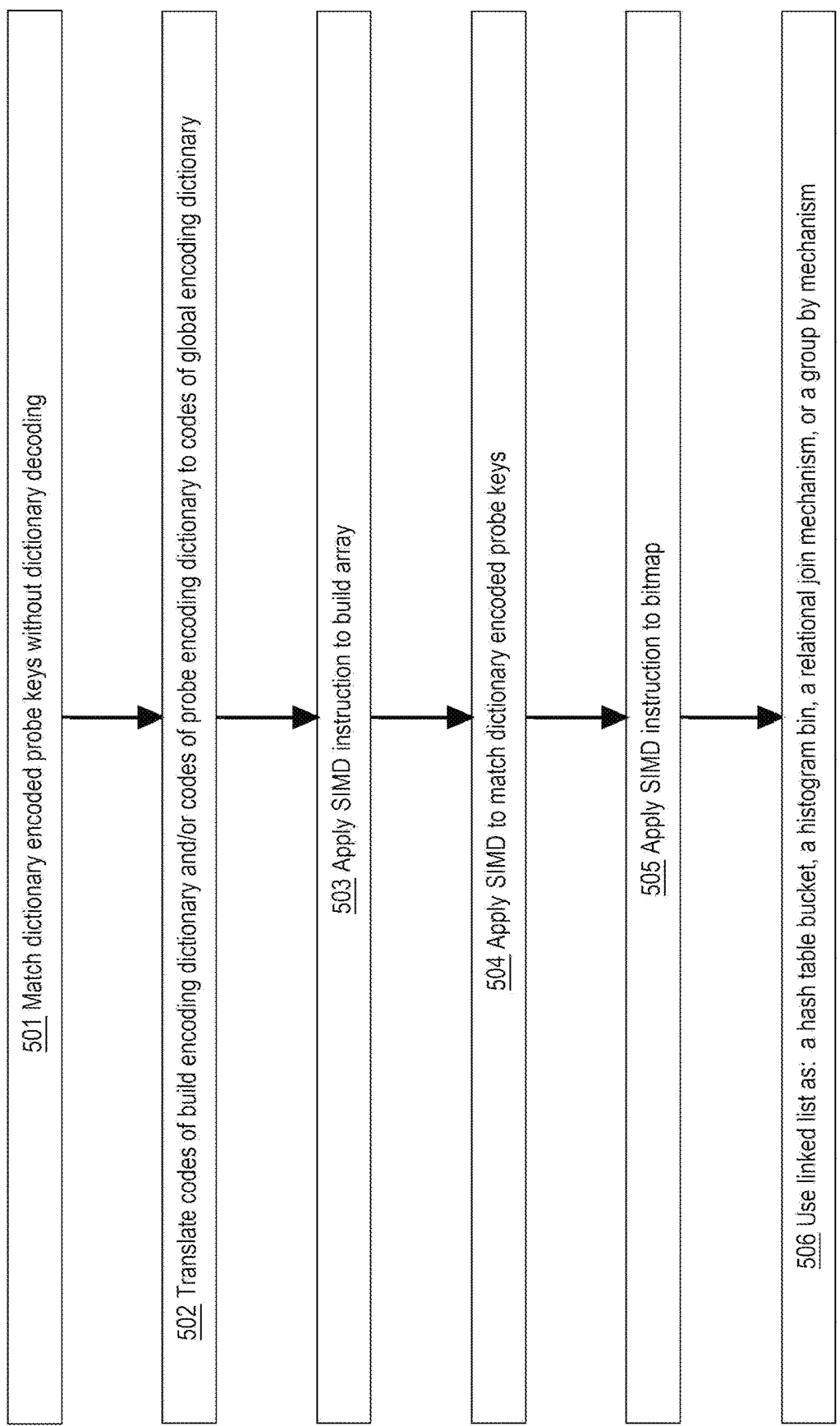
FIG. 5 is a flow diagram that depicts example acceleration activities that may occur during the build phase and/or probe phase.

FIG. 5 is a flow diagram that depicts example acceleration activities that may occur during the build phase and/or probe phase. Some of these additional activities occur during a probe phase. Others of these additional activities are equally applicable to both the build phase and probe phase as explained below. FIG. 5 is discussed with reference to FIG. 1.

Because joins herein are based on transcoding local join codes to global dictionary codes, probing build array 170 with global codes for field 140 occurs without any dictionary decoding per acceleration step 501.

As explained earlier herein, multiple local encoding dictionaries may be involved. Some cases may be helped with a global encoding dictionary that is more or less a union of multiple local encoding dictionaries, such as when: a) fields 120 and 140 (i.e. build key values and probe key values) have separate respective local encoding dictionaries, and/or b) multiple IMCUs that partition a same row set have separate respective local encoding dictionaries. In the build phase and/or the probe phase, acceleration step 502 translates codes in either direction between a global encoding dictionary and: a) a local encoding dictionary of an IMCU, and/or b) a local encoding dictionary for build key values or for probe key values.

Single instruction multiple data (SIMD) uses vector hardware for inelastic horizontal scaling with data parallelism. In various ways, acceleration step 503 may apply a SIMD machine instruction of an instruction set architecture (ISA) to build array 170 to accelerate the build phase or the probe phase such as follows. Acceleration step 504 applies SIMD to simultaneously probe elements in build array 170 for multiple global codes for field 140. Acceleration step 505 may apply SIMD to any of the bitmaps presented earlier herein, regardless of whether each global code is represented by: a) a single respective bit in the bitmap, or b) a bitfield of multiple adjacent bits in the bitmap.

A build phase and/or a probe phase for build array 170 may have various purposes that rely on correlation and/or categorization of data. Acceleration step 506 uses a data structure such as a segmented array or linked list to implement: a hash table bucket, a histogram bin, a relational join, and/or a group by. For example, a SQL DML statement may contain a JOIN clause and a GROUP BY clause, and build array 170 may be shared by the JOIN implementation and the GROUP BY implementation. For example, a GROUP BY operator may be fused with a build operator or a probe operator. Approaches for SIMD-accelerated building and probing are further discussed in related U.S. patent application Ser. No. 17/018,018 "ACCELERATED BUILDING AND PROBING OF HASH TABLES USING SYMMETRIC VECTOR PROCESSING".

8.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

8.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
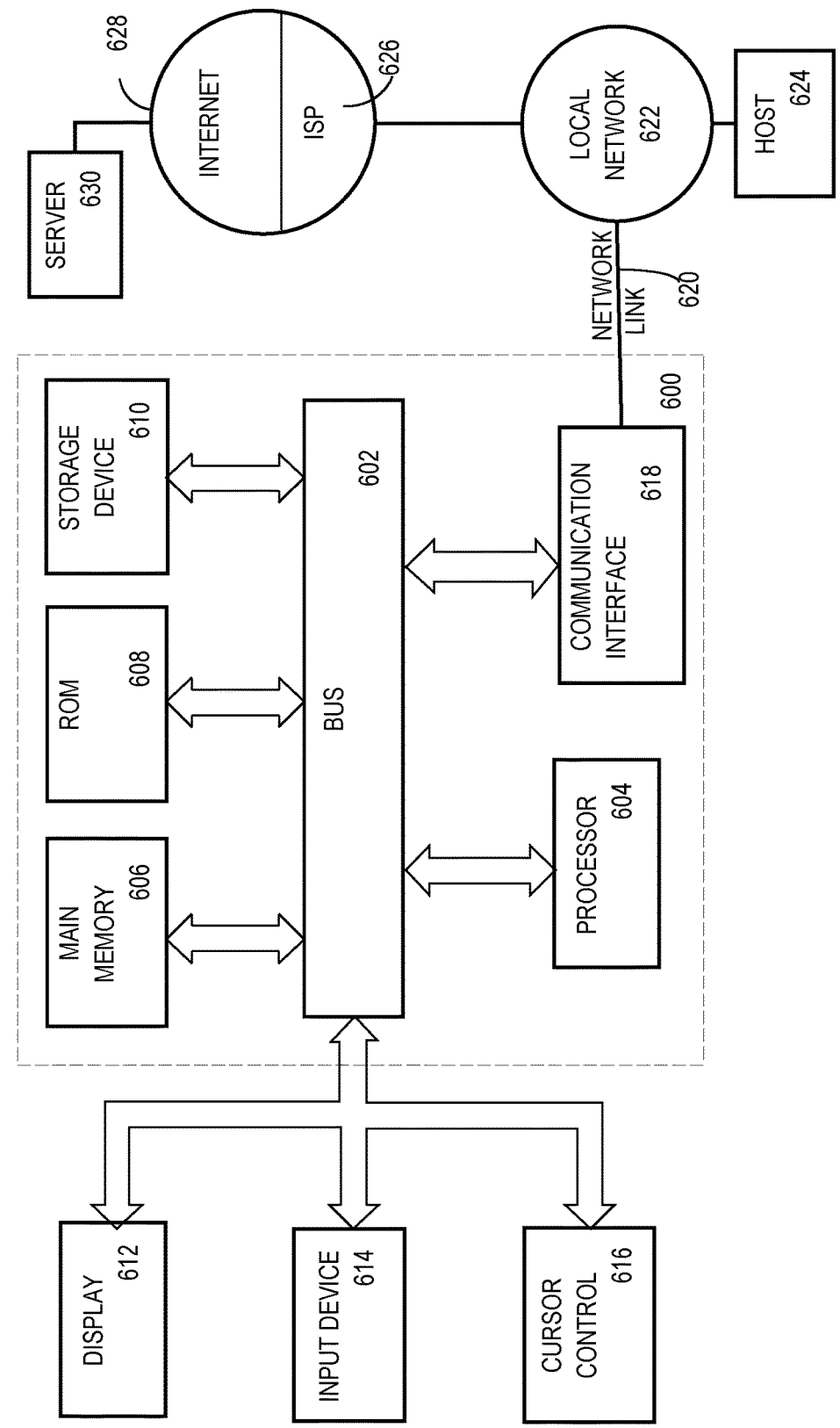
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
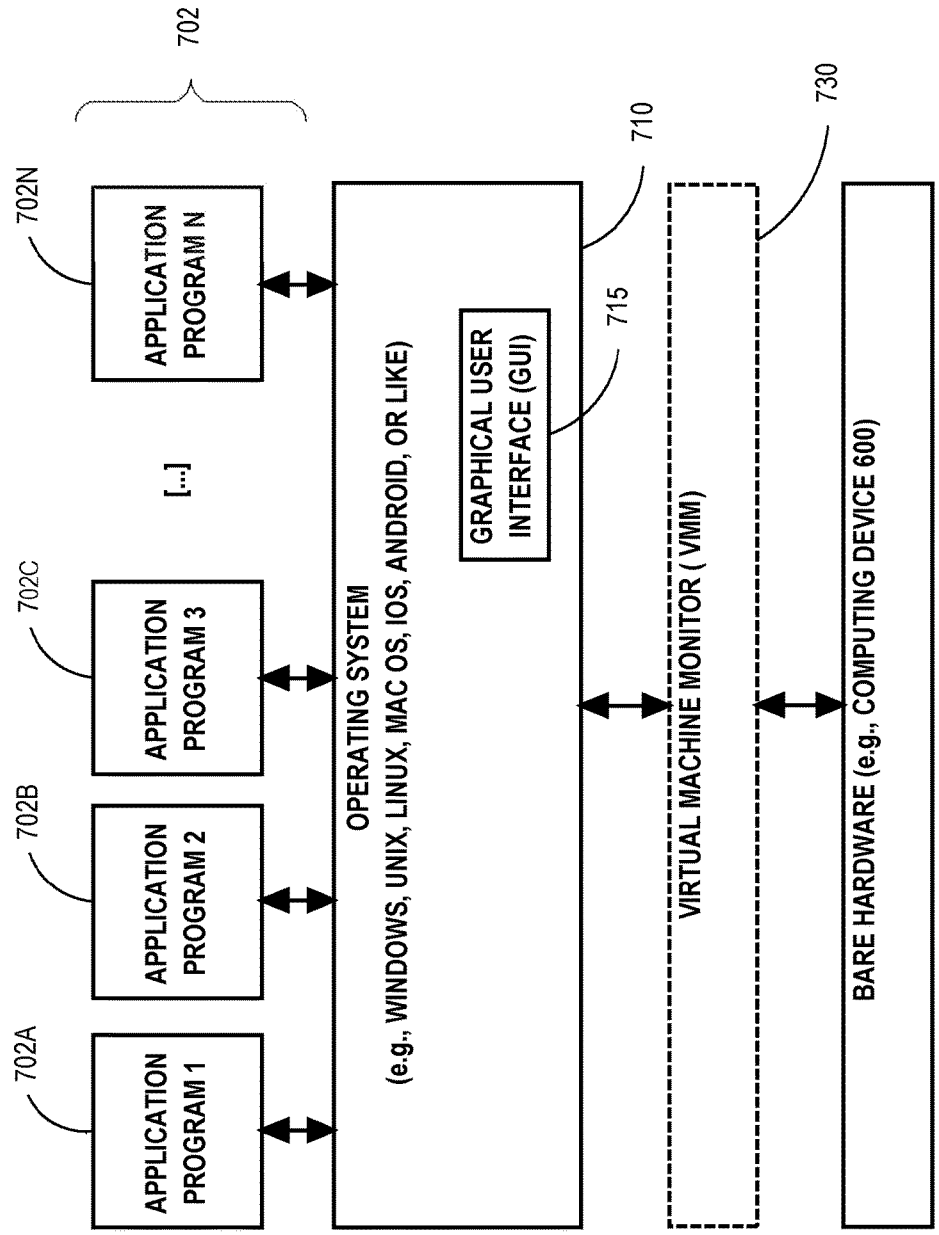
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 700 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a plurality of local encoding dictionaries that includes:
        a build encoding dictionary that contains a plurality of distinct build dictionary codes, and
        a probe encoding dictionary that contains a plurality of distinct probe dictionary codes that is not identical to said plurality of distinct build dictionary codes;
    storing a build plurality of data rows that contains a build key that contains build dictionary codes from the plurality of distinct build dictionary codes;
    storing a probe plurality of data rows that contains a probe key that contains probe dictionary codes from the plurality of distinct probe dictionary codes;
    receiving a request for a relational join of the build plurality of data rows with the probe plurality of data rows;
    transcoding the build dictionary codes from the build key and the probe dictionary codes from the probe key to global dictionary codes of a global encoding dictionary;
    populating, based on global dictionary codes for the build key, a build array whose offsets are respective global dictionary codes of the global encoding dictionary;
    accessing, based on global dictionary codes for the probe key, offsets of the build array;
    sending a response to the request for the relational join that is based on said accessing said offsets of the build array;
    wherein the method is performed by one or more computers.

2. The method of claim 1 wherein:
    a particular plurality of data rows is one selected from the group consisting of the build plurality of data rows and the probe plurality of data rows;
    said build key or said probe key is a join key for said particular plurality of data rows;
    the particular plurality of data rows comprises a first subset of data rows and a second subset of data rows;
    said join key for the first subset of data rows and said join key for the second subset of data rows contain dictionary codes of distinct respective encoding dictionaries.

3. The method of claim 2 wherein one selected from the group consisting of:
    a same unencoded value has a different respective dictionary code in said distinct respective encoding dictionaries, and
    said distinct respective encoding dictionaries contain different respective counts of dictionary codes.

4. The method of claim 1 wherein:
    said populating the build array comprises populating a bitmap that contains, for each distinct build dictionary code in the build key, a first bit and a second bit that are adjacent;
    only the first bit is set when a first build dictionary code occurs exactly once in the build key;
    only the second bit is set when a second build dictionary code occurs more than once in the build key.

5. The method of claim 1 wherein:
    said populating the build array comprises populating a bitmap that indicates which build dictionary codes occur in the build key;
    the method further comprises applying a single instruction multiple data (SIMD) instruction to the bitmap.

6. The method of claim 1 further comprising:
    allocating an aligned memory segment at an aligned address to cause a plurality of least significant bits of the aligned address to be zero;
    populating the aligned memory segment by:
        using the plurality of least significant bits of the aligned address as a counter, and
        adjusting the counter when a pointer or offset for a particular row of the build plurality of data rows is stored in the aligned memory segment.

7. The method of claim 6 further comprising using the counter to perform one selected from the group consisting of:
    provide an offset at which to store a pointer in the aligned memory segment, and
    detect that the aligned memory segment is full.

8. The method of claim 1 wherein:
    said plurality of local encoding dictionaries contain a plurality of distinct unencoded values;
    the method further comprises verifying that the global encoding dictionary contains said plurality of distinct unencoded values.

9. The method of claim 1 wherein:
    said build plurality of data rows or said probe plurality of data rows consists of a subset of data rows of an original plurality of data rows that satisfy a filter predicate;
    said build key or said probe key is a join key for said subset of data rows;
    said original plurality of data rows and said subset of data rows contain said join key;
    said join key in said original plurality of data rows contains a dictionary code that said join key in said subset of data rows does not contain;

said build array whose offsets are respective global dictionary codes of the global encoding dictionary comprises said build array whose offsets do not exceed a highest dictionary code in said join key in said subset of data rows.

10. The method of claim 1 without decoding said build key nor said probe key.

11. One or more non-transitory computer-readable media storing instructions that, when executed by one or more processors, cause:
storing a plurality of local encoding dictionaries that includes:
a build encoding dictionary that contains a plurality of distinct build dictionary codes, and
a probe encoding dictionary that contains a plurality of distinct probe dictionary codes that is not identical to said plurality of distinct build dictionary codes;
storing a build plurality of data rows that contains a build key that contains build dictionary codes from the plurality of distinct build dictionary codes;
storing a probe plurality of data rows that contains a probe key that contains probe dictionary codes from the plurality of distinct probe dictionary codes;
receiving a request for a relational join of the build plurality of data rows with the probe plurality of data rows;
transcoding the build dictionary codes from the build key and the probe dictionary codes from the probe key to global dictionary codes of a global encoding dictionary;
populating, based on global dictionary codes for the build key, a build array whose offsets are respective global dictionary codes of the global encoding dictionary;
accessing, based on global dictionary codes for the probe key, offsets of the build array;
sending a response to the request for the relational join that is based on said accessing said offsets of the build array.

12. The one or more non-transitory computer-readable media of claim 11 wherein:
a particular plurality of data rows is one selected from the group consisting of the build plurality of data rows and the probe plurality of data rows;
said build key or said probe key is a join key for said particular plurality of data rows;
the particular plurality of data rows comprises a first subset of data rows and a second subset of data rows;
said join key for the first subset of data rows and said join key for the second subset of data rows contain dictionary codes of distinct respective encoding dictionaries.

13. The one or more non-transitory computer-readable media of claim 12 wherein one selected from the group consisting of:
a same unencoded value has a different respective dictionary code in said distinct respective encoding dictionaries, and
said distinct respective encoding dictionaries contain different respective counts of dictionary codes.

14. The one or more non-transitory computer-readable media of claim 11 wherein:
said populating the build array comprises populating a bitmap that contains, for each distinct build dictionary code in the build key, a first bit and a second bit that are adjacent;
only the first bit is set when a first build dictionary code occurs exactly once in the build key;
only the second bit is set when a second build dictionary code occurs more than once in the build key.

15. The one or more non-transitory computer-readable media of claim 11 wherein:
said populating the build array comprises populating a bitmap that indicates which build dictionary codes occur in the build key;
the instructions, when executed by the one or more processors, further cause applying a single instruction multiple data (SIMD) instruction to the bitmap.

16. The one or more non-transitory computer-readable media of claim 11 wherein the instructions further, when executed by the one or more processors, cause:
allocating an aligned memory segment at an aligned address to cause a plurality of least significant bits of the aligned address to be zero;
populating the aligned memory segment by:
using the plurality of least significant bits of the aligned address as a counter, and
adjusting the counter when a pointer or offset for a particular row of the build plurality of data rows is stored in the aligned memory segment.

17. The one or more non-transitory computer-readable media of claim 16 wherein the instructions further cause using the counter to perform one selected from the group consisting of:
provide an offset at which to store a pointer in the aligned memory segment, and detect that the aligned memory segment is full.

18. The one or more non-transitory computer-readable media of claim 11 wherein:
said plurality of local encoding dictionaries contain a plurality of distinct unencoded values;
the instructions, when executed by the one or more processors, further cause verifying that the global encoding dictionary contains said plurality of distinct unencoded values.

19. The one or more non-transitory computer-readable media of claim 11 wherein:
said build plurality of data rows or said probe plurality of data rows consists of a subset of data rows of an original plurality of data rows that satisfy a filter predicate;
said build key or said probe key is a join key for said subset of data rows;
said original plurality of data rows and said subset of data rows contain said join key;
said join key in said original plurality of data rows contains a dictionary code that said join key in said subset of data rows does not contain;
said build array whose offsets are respective global dictionary codes of the global encoding dictionary comprises said build array whose offsets do not exceed a highest dictionary code in said join key in said subset of data rows.

20. The one or more non-transitory computer-readable media of claim 11 wherein the instructions do not cause decoding said build key nor said probe key.

* * * * *

UNITED STATES PATENT AND TRADEMARK OFFICE
CERTIFICATE OF CORRECTION

| | |
|---|---|
| PATENT NO. | : 11,288,275 B2 |
| APPLICATION NO. | : 17/015421 |
| DATED | : March 29, 2022 |
| INVENTOR(S) | : Krishnappa et al. |

It is certified that error appears in the above-identified patent and that said Letters Patent is hereby corrected as shown below:

In the Specification

In Column 7, Line 25, delete "orb)" and insert -- or b) --, therefor.

In Column 14, Line 58, delete "orb)" and insert -- or b) --, therefor.

In Column 15, Line 61, delete "SQL/WL" and insert -- SQL/XML --, therefor.

Signed and Sealed this
Sixteenth Day of August, 2022

Katherine Kelly Vidal
*Director of the United States Patent and Trademark Office*